US007961676B2

United States Patent
Seo et al.

(10) Patent No.: US 7,961,676 B2
(45) Date of Patent: Jun. 14, 2011

(54) APPARATUS AND METHOD FOR PROVIDING CALL-PROCESSING SERVICE IN GSM/GPRS MOBILE TERMINAL

(75) Inventors: Gwan-Gyu Seo, Suwon-si (KR); Dong-Won Ryu, Seoul (KR); Yu-Shin Kim, Osan-si (KR)

(73) Assignee: Samsung Electronics Co., Ltd (KR)

( * ) Notice: Subject to any disclaimer, the term of this patent is extended or adjusted under 35 U.S.C. 154(b) by 944 days.

(21) Appl. No.: 11/828,108

(22) Filed: Jul. 25, 2007

(65) Prior Publication Data

US 2008/0090566 A1    Apr. 17, 2008

(30) Foreign Application Priority Data

Oct. 17, 2006    (KR) ................. 2006-100686

(51) Int. Cl.
*H04W 4/00* (2009.01)
(52) U.S. Cl. .............. 370/329; 370/352; 455/434
(58) Field of Classification Search .......... None
See application file for complete search history.

(56) References Cited

U.S. PATENT DOCUMENTS

| | | | | |
|---|---|---|---|---|
| 6,826,400 B1* | 11/2004 | Cashman et al. | ............... | 455/434 |
| 7,092,370 B2* | 8/2006 | Jiang et al. | ............... | 370/329 |
| 7,167,710 B2* | 1/2007 | Thakkar et al. | ............... | 455/450 |
| 2004/0052246 A1* | 3/2004 | Jang | ............... | 370/352 |
| 2004/0184439 A1* | 9/2004 | Blanc et al. | ............... | 370/349 |
| 2005/0030928 A1* | 2/2005 | Virtanen et al. | ............... | 370/338 |
| 2006/0056342 A1* | 3/2006 | Lee | ............... | 370/328 |
| 2009/0323623 A1* | 12/2009 | Julka et al. | ............... | 370/329 |

FOREIGN PATENT DOCUMENTS

| | | |
|---|---|---|
| EP | 1638358 | 3/2006 |
| EP | 1679927 | 7/2006 |
| KR | 102003005086 | 6/2003 |
| KR | 102005001760 | 2/2005 |
| KR | 102006002547 | 3/2006 |
| KR | 102006010000 | 9/2006 |
| WO | WO 99/52312 | 10/1999 |
| WO | WO 00/03554 | 1/2000 |
| WO | WO 01/003451 | 1/2001 |

\* cited by examiner

*Primary Examiner* — Robert C Scheibel
(74) *Attorney, Agent, or Firm* — The Farrell Law Firm, P.C.

(57) ABSTRACT

Provided is an apparatus and method for providing a call-processing service in a mobile terminal. The apparatus includes a circuit processor that provides a Circuit Service (CS), a packet processor that provides a Packet Service (PS), a period measuring unit that measures a delayed paging period in which a call-processing signal is detected while the PS is provided, and a monitoring unit that shifts the PS to a standby mode during the delayed paging period measured by the period measuring unit if the packet processor is in the process of receiving the PS, and controls the circuit process to provide the CS if the call-processing signal is received.

13 Claims, 2 Drawing Sheets

APPARATUS AND METHOD FOR PROVIDING CALL-PROCESSING SERVICE IN GSM/GPRS MOBILE TERMINAL

PRIORITY

This application claims priority under 35 U.S.C. §119 to an application filed in the Korean Intellectual Property Office on Oct. 17, 2006 and assigned Serial No. 2006-100686, the contents of which are incorporated herein by reference.

BACKGROUND OF THE INVENTION

1. Field of the Invention

The present invention relates generally to an apparatus and method for providing a call-processing service in a Global System for Mobile Communications/General Packet Radio Service (GSM/GPRS) mobile terminal, and more particularly, to an apparatus and method for providing a call-processing service when a Circuit Service (CS) call-processing signal is received while the GSM/GPRS mobile terminal provides a Packet Service (PS).

2. Description of the Related Art

In general, a mobile communication system provides a service that provides voice and data packets through a wireless network. With the increasing popularity of a mobile terminal, it is imperative for the mobile communication system to have a network architecture in which the voice and data packets can be further effectively transmitted. In particular, the provision of various services results in a large data size. To cope with this trend, a GPRS network has been developed which is enhanced from an existing packet-switched GSM network. Users may subscribe a packet data service (e.g., GPRS) mainly for the purpose of using conventional basic Internet applications such as a file transfer through a wireless Personal Computer (PC), an e-mail communication and an Internet exploration through the World Wide Web (WWW).

The mobile terminal may simultaneously provide either or both of a CS and a PS. However, the conventional GSM/GPRS mobile terminal cannot simultaneously provide both the CS and the PS, and thus cannot detect the reception of a CS call-processing signal while the PS is provided.

Accordingly, there is a need for an apparatus and method in which the CS call-processing signal can be detected while the PS is provided when the aforementioned GSM/GPRS mobile terminal is used.

SUMMARY OF THE INVENTION

The present invention provides an apparatus and method for receiving a call-processing signal in a GSM/GPRS mobile terminal.

The present invention provides an apparatus and method for providing a call-processing service by detecting a CS call-processing signal while a GSM/GPRS receives a PS.

The present invention provides an apparatus and method for providing a call-processing service by detecting a CS call-processing signal with a specific period while a GSM/GPRS mobile terminal receives a PS.

The present invention provides an apparatus and method for providing a call-processing service by delaying a PS and detecting a CS call-processing signal with a specific period while a GSM/GPRS mobile terminal receives the PS.

According to one aspect of the present invention, there is provided an apparatus for providing a call-processing service in a mobile terminal, including a circuit processor that provides a CS, a packet processor that provides a PS, a period measuring unit that measures a delayed paging period in which a call-processing signal is detected while the PS is provided, and a monitoring unit that shifts the PS to a standby mode during the delayed paging period measured by the period measuring unit if the packet processor is in the process of receiving the PS, and controls the circuit process to provide the CS if the call-processing signal is received.

According to another aspect of the present invention, there is provided a method of providing a call-processing service of a mobile terminal, including measuring a delayed paging period when a PS starts, shifting the PS to a standby mode while in the delayed paging period, detecting the reception of a CS call-processing signal and providing the CS if the detection result shows that the call-processing signal is received.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail for the sake of clarity and conciseness.

The present invention provides an apparatus and method for providing a call-processing service by delaying a PS and detecting a CS call-processing signal with a specific period while a GSM/GPRS mobile terminal receives the PS. Herein, the specific period is determined to detect the call-processing signal in consideration of the PS in order to reduce a PS delay that occurs when the call-processing signal is frequently received.

Figure 1:
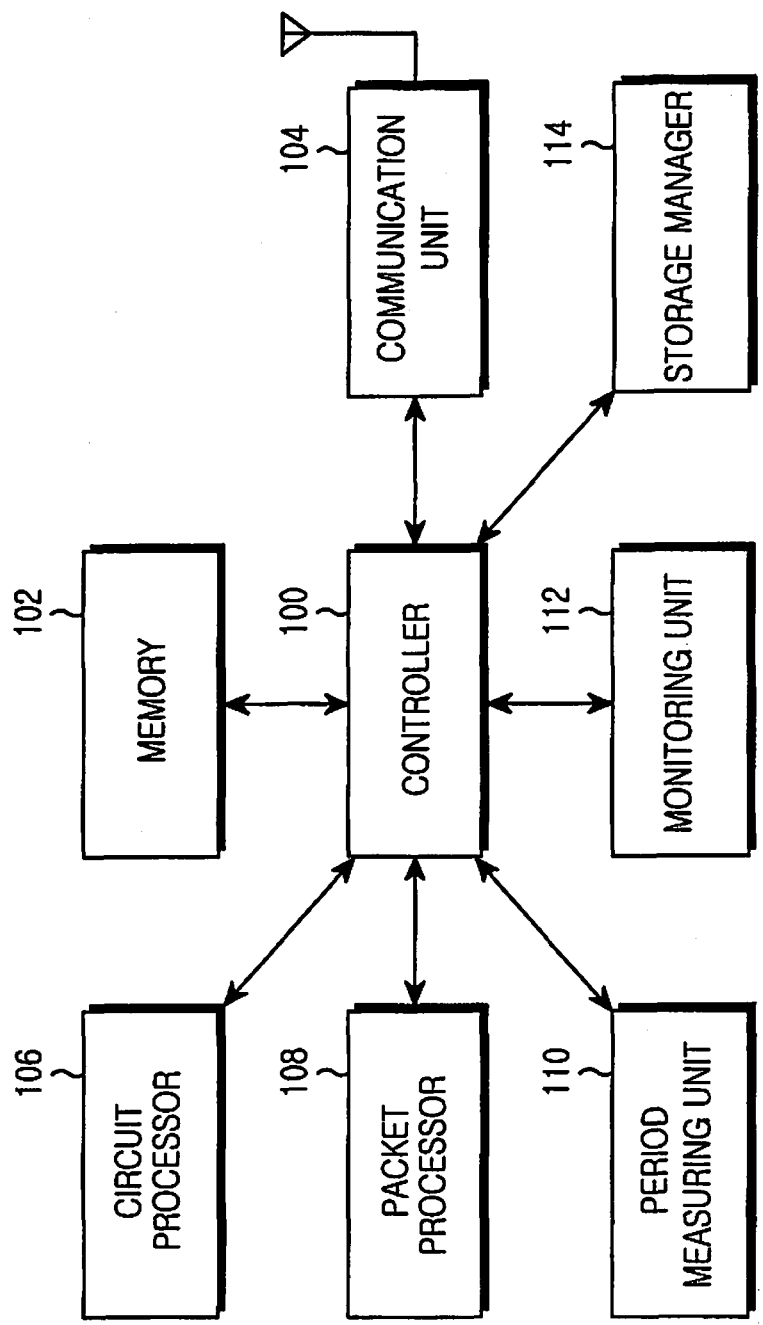
FIG. 1 illustrates a GSM/GPRS mobile terminal according to the present invention.

FIG. 1 illustrates a GSM/GPRS mobile terminal according to the present invention. Referring to FIG. 1, the mobile terminal includes a controller 100, a memory 102, a communication unit 104, a circuit processor 106, a packet processor 108, a period measuring unit 110, a monitoring unit 112 and a storage manager 114 for storing and managing a flow control factor.

The memory 102 temporarily stores a program that controls overall operations of the mobile terminal and data that is generated during operation. Further, the memory 102 stores various contents (e.g., short messages, multimedia messages, photos and video data). Under the control of the storage manager 114, the memory 102 also stores a flow control factor such as a packet number that is required when the PS is switched to a standby mode and is requested again.

The communication unit 104 transmits/receives packet data as well as a voice signal for the CS. In the receiving process, a frequency of a Radio Frequency (RF) signal received through an antenna is decreased, and then the received signal is de-spread and channel-decoded. In the transmitting process, the received signal is channel-coded and spread, and then the frequency thereof is increased for transmission through the antenna.

The circuit processor 106 controls the communication unit 104 to provide a circuit exchange service such as a voice call and a short message.

The packet processor 108 controls the communication unit 104 to transmit/receive the packet data so as to provide the PS. By utilizing the flow control factor stored in the memory 102, the PS may be continuously provided even after the PS is released from the standby mode.

The period measuring unit 110 measures a delayed paging period required to detect a call-processing signal while the PS is provided. Paging may be conducted while the PS is provided with a normal paging period (hereinafter, the paging period defined in the $3^{rd}$ Generation Partnership Project (3GPP) standard will be referred to as an 'original paging period') in which the PS is not provided. In this case, frequent paging may harm the PS. The delayed paging period of the present invention is provided to reduce a PS delay, and has a relatively longer time interval than the original paging period.

The period measuring unit 110 measures the delayed paging period using Equation 1.

$$\text{delayed paging period} = \text{original paging period} \times 1 \text{ (if } 6 \leq BS\_PA\_MFRMS < 9);$$

$$\text{delayed paging period} = \text{original paging period} \times 2 \text{ (if } 4 \leq BS\_PA\_MFRMS < 6);$$

$$\text{delayed paging period} = \text{original paging period} \times 3 \text{ (if } 2 \leq BS\_PA\_MFRMS < 4); \text{ and}$$

$$\text{delayed paging period} = \text{original paging period (if } BS\_PA\_MFRMS = \text{any number except for above numbers)}. \quad (1)$$

Here, BS_PA_MFRMS is a factor for measuring an original paging period included in a paging channel of a Broadcast Control CHannel (BCCH) defined in the 3GPP standard.

The original paging period and the BS_PA_MFRMS are compliant with the 3GPP multi-frame paging standard. Meanwhile, according to the standard, the original paging period is measured using Equation 2.

$$\text{original paging period} = (BS\_PA\_MFRMS + 2) \times 4.615 \times 51 \quad (2)$$

Here, BS_PA_MFRMS is a factor for measuring an original paging period included in a paging channel of a BCCH defined in the 3GPP standard.

When the packet processor 108 is in the process of providing the PS, the monitoring unit 112 checks for the delayed paging period measured by the period measuring unit 110, shifts the PS, which is provided by the packet processor 108 during the delayed paging period, to the standby mode, and checks for whether the call-processing signal is received. If the call-processing signal is being received, the packet processor 108 controls the circuit processor 106 to provide the CS.

When the packet processor 108 is switched to the standby mode while the PS is provided, the storage manager 114 controls the memory 102 to store a flow control factor required for a packet communication flow such as a packet number of a packet being transmitted.

The controller 100 controls and performs functions of the circuit process 106, the packet processor 108, the period measuring unit 110, the monitoring unit 112, and the storage manager 114. These components are separately constructed in the present invention in order to individually explain their functions. In practice, therefore, some or all of these components may be processed by the controller 100.

Figure 2:
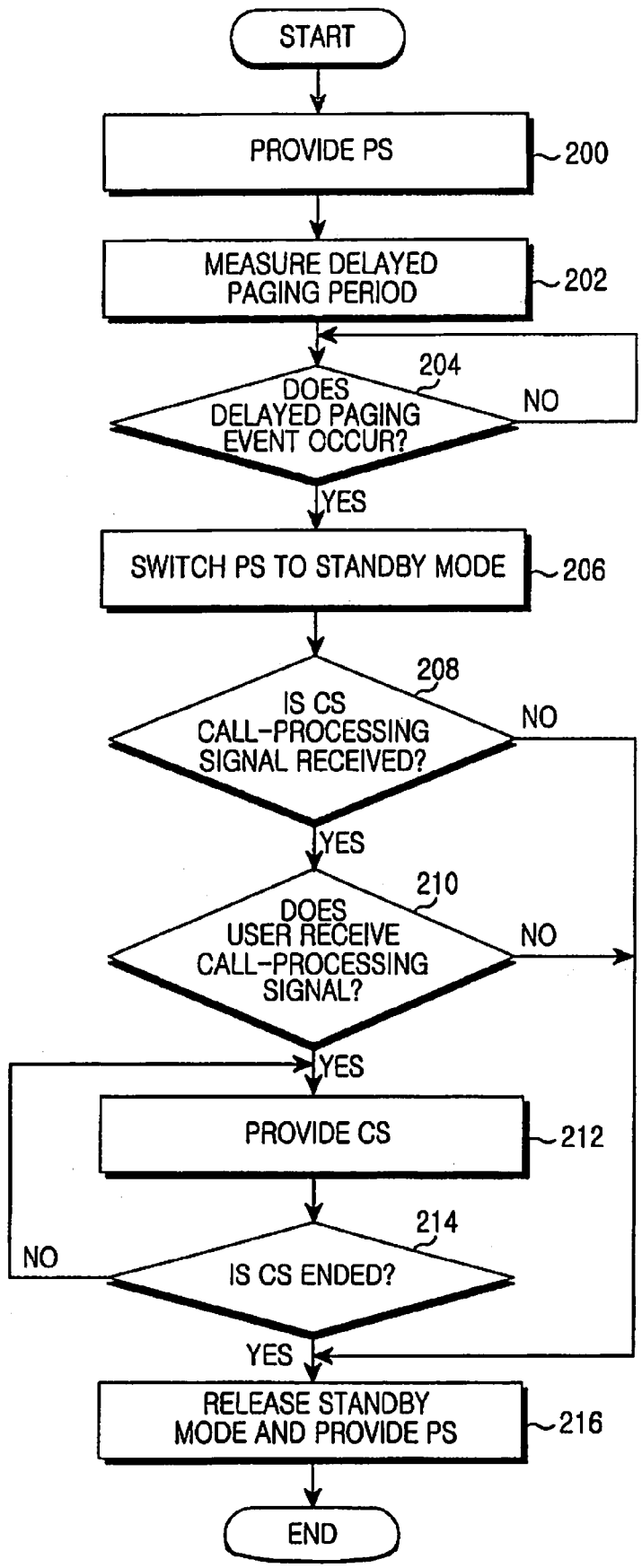
FIG. 2 illustrates a method that provides a call-processing service by detecting the reception of a CS call-processing signal while the GSM/GPRS mobile terminal provides a PS according to the present invention.

FIG. 2 illustrates the method above according to the present invention. Referring to FIG. 2, the PS starts at the request of the GSM/GPRS mobile terminal of the present invention in step 200. A delayed paging period is measured in step 202. Then, it is checked whether a delayed paging event occurs according to the delayed paging period in step 204.

If the checking result shows that the delay paging event occurs according to the delayed paging period, the PS being provided is switched to a standby mode in step 206. In this step, a flow control factor is stored which is required for a packet communication flow such as a packet number of a packet being transmitted when the PS is switched to the standby mode.

Thereafter, the reception of the CS call-processing signal is detected in step 208. If the detection result shows that no call-processing signal is received, the PS is released from the standby mode, and thus the PS is continuously provided by using the stored flow control factor in step 216.

Otherwise, it is determined whether a user receives the call-processing signal in step 210. If it is determined that the reception of the call-processing signal is denied, the PS is released from the standby mode, and thus the PS is continuously provided by using the stored flow control factor in step 216.

On the other hand, if it is determined that the call-processing signal is received, the CS is provided in step 212 until the CS is ended in step 214. If the CS is ended in step 214, the PS is released from the standby mode, and thus the PS is continuously provided by using the stored flow control factor in step 216.

According to the present invention, an apparatus and method is provided in which a call-processing service is provided by delaying a PS and detecting a CS call-processing signal with a specific period while a GSM/GPRS mobile terminal receives the PS. Therefore, an advantage is provided in that the GSM/GPRS mobile terminal, which provides either the CS or the PS at a time, can detect the CS call-processing signal while the PS is received.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for providing a call-processing service in a mobile terminal, comprising:
   a circuit processor that provides a Circuit Service (CS);
   a packet processor that provides a Packet Service (PS);
   a period measuring unit that measures a delayed paging period in which a call-processing signal is detected while the PS is provided; and a monitoring unit that shifts the PS to a standby mode during the delayed paging period measured by the period measuring unit if the packet processor is in the process of receiving the PS, and controls the circuit processor to provide the CS if the call-processing signal is received, wherein the delayed paging period is relatively longer than an original paging period for detecting the call-processing signal when the PS is not provided, and wherein the delayed paging period is measured using the following Equations:

delayed paging period=original paging period×1 (if 6≦BS_PA_MFRMS<9):

delayed paging period=original paging period×2 (if 4≦BS_PA_MFRMS<6);

delayed paging period=original paging period×3 (if 2≦_BS_PA_MFRMS<4); and delayed paging period=original paging period (if BS_PA_MFRMS=any number except for above numbers), where BS_PA_MFRMS is a factor for measuring an original paging period included in a paging channel of a Broadcast Control CHannel (BCCH) defined in the 3$^{rd}$ Generation Partnership Project (3GPP™) standard.

2. The apparatus of claim 1, further comprising:
a memory that stores a flow control factor for continuously providing the PS when the PS is released from the standby mode; and
a storage manager that controls the memory to store the flow control factor required for a packet communication flow when the PS is switched to the standby mode while the PS is provided.

3. The apparatus of claim 2, wherein the monitoring unit allows the PS to be released from the standby mode when the PS does not detect a reception of the call-processing signal while in the standby mode or detects an end of CS.

4. The apparatus of claim 2, wherein the packet processor allows the PS to be continuously provided by using the flow control factor stored in the memory when the monitoring unit receives a request of releasing the standby mode of the PS.

5. A method of providing a call-processing service of a mobile terminal, comprising:
measuring a delayed paging period when a Packet Service (PS) starts;
shifting the PS to a standby mode while in the delayed paging period;
detecting the reception of a Circuit Service (CS) call-processing signal; and
providing the CS if the detection result shows that the call-processing signal is received,
wherein the delayed paging period is relatively longer than an original paging period for detecting the call-processing signal when the PS is not provided, and
wherein the delayed paging period is measured using the following Equations:

delayed paging period=original paging period×1 (if 6≦BS_PA_MFRMS<9):

delayed paging period=original paging period×2 (if 4≦BS_PA_MFRMS<6);

delayed paging period=original paging period×3 (if 2≦_BS_PA_MFRMS<4); and delayed paging period=original paging period (if BS_PA_MFRMS=any number except for above numbers), where BS_PA_MFRMS is a factor for measuring an original paging period included in a paging channel of a Broadcast Control CHannel (BCCH) defined in the 3$^{rd}$ Generation Partnership Project (3GPP™) standard.

6. The method of claim 5, further comprising, after shifting the PS to the standby mode, storing a flow control factor required for a packet communication flow when the PS is switched to the standby mode while the PS is provided.

7. The method of claim 6, further comprising:
releasing the standby mode of the PS when the reception of the call-processing signal is not detected in the step of detecting the reception of the CS call-processing signal; and
continuously providing the PS by using the stored flow control factor when the standby mode is released.

8. The method of claim 6, further comprising, after the providing the CS,
releasing the standby mode of the PS when an end of the CS is detected; and
continuously providing the PS by using the stored flow control factor when the standby mode is released.

9. An apparatus for providing a call-processing service in a mobile terminal, comprising:
means for measuring a delayed paging period when a Packet Service (PS) starts;
means for shifting the PS to a standby mode while in the delayed paging period;
means for detecting the reception of a Circuit Service (CS) call-processing signal; and
means for providing the CS if the detection result shows that the call-processing signal is received,
wherein the delayed paging period is relatively longer than an original paging period for detecting the call-processing signal when the PS is not provided, and
wherein the delayed paging period is measured using the following Equations:

delayed paging period=original paging period×1 (if 6≦BS_PA_MFRMS<9);

delayed paging period=original paging period×2 (if 4≦BS_PA_MFRMS<6);

delayed paging period=original paging period×3 (if 2≦BS_PA_MFRMS<4); and delayed paging period=original paging period (if BS_PA_MFRMS=any number except for above numbers), where BS_PA_MFRMS is a factor for measuring an original paging period included in a paging channel of a Broadcast Control CHannel (BCCH) defined in the 3$^{rd}$ Generation Partnership Project (3GPP™) standard.

10. The apparatus of claim 9, further comprising, means for storing a flow control factor required for a packet communication flow.

11. The apparatus of claim 10, further comprising:
means for releasing the standby mode of the PS when the reception of the call-processing signal is not detected in the step of detecting the reception of the CS call-processing signal; and
means for continuously providing the PS by using the stored flow control factor when the standby mode is released.

12. The apparatus of claim 10, further comprising:
means for releasing the standby mode of the PS when an end of the CS is detected; and
means for continuously providing the PS by using the stored flow control factor when the standby mode is released.

13. A non-transitory computer-readable recording medium having recorded thereon a program for providing a call-processing service in a mobile terminal, the program comprising instructions which when executed cause the mobile terminal to:
measuring a delayed paging period when a Packet Service (PS) starts;
shifting the PS to a standby mode while in the delayed paging period;
detecting the reception of a Circuit Service (CS) call-processing signal; and
providing the CS if the detection result shows that the call-processing signal is received,
wherein the delayed paging period is relatively longer than an original paging period for detecting the call-processing signal when the PS is not provided, and
wherein the delayed paging period is measured using the following Equations:

delayed paging period=original paging period×1 (if $6 \leq BS\_PA\_MFRMS < 9$);

delayed paging period=original paging period×2 (if $4 \leq BS\_PA\_MFRMS < 6$);

delayed paging period=original paging period×3 (if $2 \leq BS\_PA\_MFRMS < 4$); and delayed paging period=original paging period (if BS_PA_MFRMS=any number except for above numbers), where BS_PA_MFRMS is a factor for measuring an original paging period included in a paging channel of a Broadcast Control CHannel (BCCH) defined in the $3^{rd}$ Generation Partnership Project (3GPP™) standard.

* * * * *